United States Patent [19]

Tezuka et al.

[11] 4,337,380
[45] Jun. 29, 1982

[54] STRUCTURE FOR MOUNTING SPEAKER

[75] Inventors: Hisao Tezuka; Hiroshi Furui, both of Toda, Japan

[73] Assignee: Clarion Co., Ltd., Tokyo, Japan

[21] Appl. No.: 169,239

[22] Filed: Jul. 16, 1980

[30] Foreign Application Priority Data

Jul. 18, 1979 [JP] Japan .............. 54/97946[U]

[51] Int. Cl.³ ............................................. H04R 1/02
[52] U.S. Cl. ........................... 179/146 E; 179/1 VE; 181/150
[58] Field of Search ............ 179/1 VE, 146 R, 146 E, 179/178, 184; 181/150

[56] References Cited

U.S. PATENT DOCUMENTS 2,115,098  4/1938  Engholm .................. 179/146 E
2,417,153  3/1947  Darr ......................... 179/146 R
3,859,480  1/1975  Birkner et al. ............ 179/178

OTHER PUBLICATIONS

RCA Technical Note #576, Dec. 1964, Loud Speaker Retainer, W. Moore.

Primary Examiner—George G. Stellar
Attorney, Agent, or Firm—Blanchard, Flynn, Thiel, Boutell & Tanis

[57] ABSTRACT

A structure for mounting a speaker at a pocket portion formed on a vertical wall, which is characterized by engaging portions formed at peripheral portions of a speaker base member with a speaker fixed thereto and U-shaped spring members which are each adapted to engage, at one end thereof, with a flange of the pocket portion and engage, at another end, with said engaging portions, respectively.

2 Claims, 6 Drawing Figures

STRUCTURE FOR MOUNTING SPEAKER

BACKGROUND OF THE INVENTION

1. Field of the Invention

This invention relates to a structure for mounting a speaker, and more particularly to a structure capable of easily mounting a speaker on a car utilizing a pocket provided on a side lining of the car.

2. Description of the Prior Art

As one method for mounting a speaker on a car, there has been proposed to utilize a pocket portion formed on a side lining of the car. To accomplish this method, a pocket is detached out of its installed position and subjected to various processing or the pocket is removed to allow the speaker to be installed in place of the pocket.

However, this conventional method involves a considerable number of processing steps, and yet satisfactory result cannot always be attained.

OBJECT OF THE INVENTION

It is therefore an object of the present invention to provide a structure for mounting a speaker which can obviate the disadvantages involved in the conventional art.

It is another object of the present invention to provide a structure capable of easily and stably mounting a speaker on a car.

SUMMARY OF THE INVENTION

In accordance with the present invention, there is provided a structure for mounting a speaker which comprises:

a speaker;

a base member with said speaker fixed thereto;

a plurality of engaging portions formed on said base member;

a pocket portion formed on a vertical wall and having a flange portion;

U-shaped spring members;

each of said U-shaped spring members being adapted to engage at one end thereof with said flange portion and at another end thereof with the corresponding engaging portion.

DESCRIPTION OF THE PREFERRED EMBODIMENT

Figure 1:
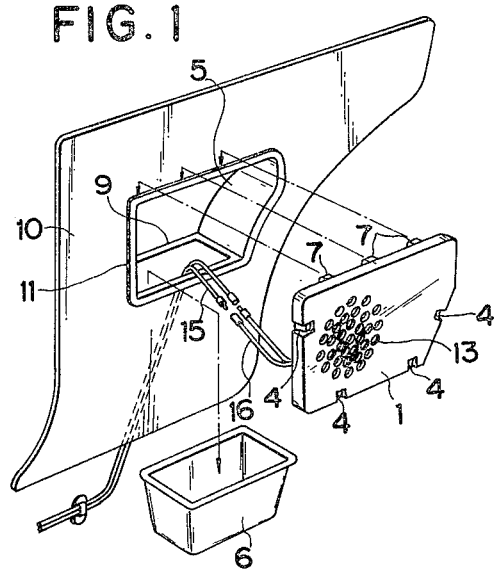
FIG. 1 is a perspective view of a general structure according to the invention, illustrating an operational relation between elements of the structure.

The invention will now be described in detail, referring to a preferred embodiment as illustrated in the drawings.

Figure 2:
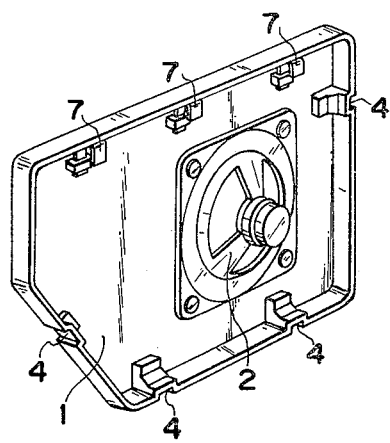
FIG. 2 is a perspective view of a rear side of a speaker base member.
Figure 3:
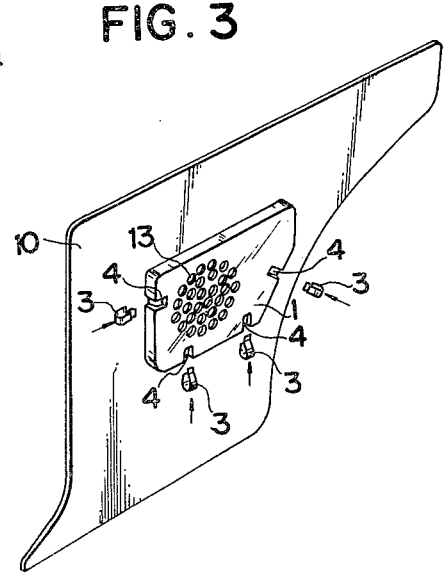
FIG. 3 is an explanatory perspective view, illustrating an operation of fixing the base member by a U-shaped spring member.
Figure 5:
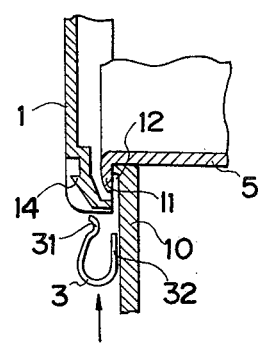
FIG. 5 is a fragmentary sectional view illustrating an engaging operation by the U-shaped spring member.
Figure 6:
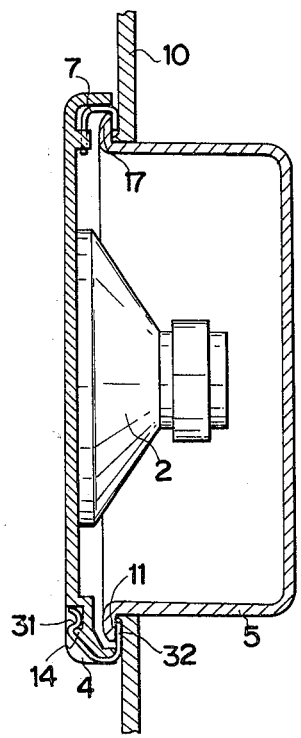
FIG. 6 is a sectional view of the general structure of the invention, illustrating the same in the fixed state after completion of the mounting operation.

In FIGS. 1 and 2 a speaker base member 1 is formed so as to generally coincide with a configuration of a pocket portion 5 provided on a side lining 10 on a side of a rear seat of a car as illustrated in FIG. 1. The pocket portion 5 has a flange 11 which extends from the periphery of the pocket portion 5 in parallel with a face of the side lining. A speaker 2 is preliminarily fixed to the rear side of the base member 1 as can be seen from FIG. 2. The base member 1 has a plurality of openings 13 at a portion where the speaker 2 is fixed. The so formed base member 1 is provided with a plurality of engaging portions on the periphery thereof to be fixed to the pocket portion 5 on the side lining as illustrated in FIGS. 3, 5 and 6. The base member 1 is connected to the flange 11 of the pocket portion 5 through U-shaped spring members as depicted in FIGS. 3, 5 and 6. Each of the spring members 3 as shown in FIG. 5 has at one end thereof a curved locking portion 31 which is engageable with a stepped portion 14 formed at the engaging portion 4 when the spring is fitted to the engaging portion for locking the base plate 1. Another end 32 of the fitted spring member 3 is engaged with and locked in a gap between an outer surface of the side lining 10 and a rear side of the flange 11. Thus, the base plate 1, or the speaker 2, can be positively and stably fixed or mounted at the desired position through the locking at the respective engaging portions 4.

The operation for mounting the speaker at the pocket portion 5 of the car will now be described.

Where the pocket portion 5 has a lower opening portion 9 and a lower pocket 6 installed therein as illustrated in FIG. 1, the lower pocket 6 is first removed out of the opening 9; extension leads 15 are drawn out therefrom and connected to leads 16 from the speaker 2; the lower pocket 6 is placed in the lower opening 9 again; the base member 1 is attached to the pocket portion 5; and the spring members 3 are fitted to the respective engaging portions 4.

Figure 4:
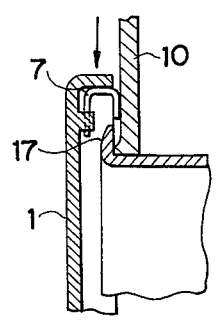
FIG. 4 is a fragmentary sectional view of a locking structure at an upper portion of the base member.

In the illustrated embodiment, hook members 7 are preliminarily fixed to an upper portion of the base member 1 as illustrated in FIG. 4. In this case, advantageously, the upper portion of the base member 1 is first engaged with an upper perimeter 17 of the flange 11 of the pocket portion 5 through the hook members 7, prior to the operation for locking the base member 1 and the flange 11 by the spring members 3 as stated above. Thus, the base member 1 is firmly held and positioned through the engagement between the upper perimeter 17 and the hook members 7, so that the succeeding operation of fixing the base member 1 by the spring members 3 can be carried out easily and accurately. However, the hook member is not essential to the present invention, and instead of using the hook members 7, additional spring members may be employed.

According to the present invention as mentioned above, to mount a speaker 2 on a car by utilizing a pocket portion formed on a side wall of the car, engaging portions are formed on a base member 1 on which the speaker 2 is preliminarily fixed and U-shaped spring members 3 adapted to engage, at one end thereof, with a flange of the pocket portion and engage, at another end thereof, with the engaging portions respectively, are employed. Therefore, the speaker can be easily mounted on the pocket portion of the car without complicated steps as required in the conventional method. In addition, the present invention enables stable mounting of the speaker.

We claim:

1. A structure for mounting a speaker which comprises:
   a speaker;
   a base member with said speaker fixed thereto;
   a plurality of engaging portions formed on said base member;
   a pocket portion formed on a vertical wall and having a flange portion;
   U-shaped spring members;
   each of said U-shaped spring members being adapted to engage at one end thereof with said flange portion and at another end thereof with the corresponding engaging portion.

2. An apparatus of claim 1, which further comprises one or more hook members fixed to an upper portion of said base member, said hook member or members being adapted to engage with an upper portion of said flange portion.

* * * * *